US012691927B2

(12) United States Patent
Hamada

(10) Patent No.: US 12,691,927 B2
(45) Date of Patent: Jul. 28, 2026

(54) ELECTRIC DRIVE DEVICE

(71) Applicant: HITACHI ASTEMO, LTD.,
Hitachinaka (JP)

(72) Inventor: Keiji Hamada, Hitachinaka (JP)

(73) Assignee: HITACHI ASTEMO, LTD.,
Hitachinaka (JP)

( * ) Notice: Subject to any disclaimer, the term of this
patent is extended or adjusted under 35
U.S.C. 154(b) by 894 days.

(21) Appl. No.: 17/797,215

(22) PCT Filed: Feb. 5, 2021

(86) PCT No.: PCT/JP2021/004207
§ 371 (c)(1),
(2) Date: Aug. 3, 2022

(87) PCT Pub. No.: WO2021/161904
PCT Pub. Date: Aug. 19, 2021

(65) Prior Publication Data
US 2023/0067913 A1 Mar. 2, 2023

(30) Foreign Application Priority Data
Feb. 13, 2020 (JP) ................................. 2020-022090

(51) Int. Cl.
*B62D 5/04* (2006.01)
*H02K 5/22* (2006.01)
*H02K 11/33* (2016.01)

(52) U.S. Cl.
CPC ......... *B62D 5/0406* (2013.01); *B62D 5/0463*
(2013.01); *H02K 5/22* (2013.01); *H02K 11/33*
(2016.01)

(58) Field of Classification Search
CPC ...... B62D 5/0406; B62D 5/0463; H02K 5/22;
H02K 11/33; H02K 5/10; H02K 5/225
See application file for complete search history.

(56) References Cited

U.S. PATENT DOCUMENTS

| | | | |
|---|---|---|---|
| 11,096,268 B2 * | 8/2021 | Goatley | ................ H05K 7/209 |
| 2020/0156696 A1 | 5/2020 | Hara et al. | |
| 2021/0226507 A1 | 7/2021 | Hamada | |

FOREIGN PATENT DOCUMENTS

| | | |
|---|---|---|
| JP | 2019-080468 A | 5/2019 |
| JP | 2019-140837 A | 8/2019 |
| WO | WO-2019/003501 A1 | 1/2019 |

OTHER PUBLICATIONS

International Search Report dated Apr. 27, 2021 issued in International Application No. PCT/JP2021/004207, with English translation, 5 pages.

(Continued)

*Primary Examiner* — Christopher M Koehler
*Assistant Examiner* — Riley Owen Stout
(74) *Attorney, Agent, or Firm* — FOLEY & LARDNER
LLP

(57) ABSTRACT

An electric drive device of the present invention has: a connector assembly 13 having external terminal forming portion 13B, 13S; a metal cover 12 accommodating connector assembly 13 with external terminal forming portion 13B, 13S exposed; an annular seal portion 23 having an annular seal groove 31 in which metal cover 12 and connector assembly 13 are sealed; and a plurality of fixing bolts 21 fixing connector assembly 13 to a housing 11. Annular seal groove 31 is formed in region that connects two fixing bolts 21 in a straight line. Since annular seal groove 31 is formed in the straight region connecting the two fixing bolts 21, warp of region where annular seal portion 23 is formed is corrected by the fixing bolts 21, thereby securing good sealing performance between annular seal portion 23 of connector assembly 13 and an annular protruding edge portion 28P of metal cover 12.

14 Claims, 7 Drawing Sheets

(56)  References Cited

OTHER PUBLICATIONS

Written Opinion of the International Searching Authority dated Apr. 27, 2021 issued in International Application No. PCT/JP2021/004207, with English translation, 12 pages.

* cited by examiner

ELECTRIC DRIVE DEVICE

TECHNICAL FIELD

The present invention relates to an electric drive device, and more particularly to an electric drive device having an electronic control unit.

BACKGROUND ART

In a field of general industrial equipment, a mechanical control element is driven by an electric motor. In recent years, so-called electrically mechanically integrated electric drive device, which is configured such that an electronic control unit formed from a semiconductor element etc. controlling a rotation speed and/or a rotation torque of the electric motor is integrally mounted in the electric motor, has been used.

As an example of the electrically mechanically integrated electric drive device, for instance, an electric power steering device is configured such that a turning direction and a turning torque of a steering shaft that turns by driver's operation of a steering wheel are detected, and on the basis of these detection values, the electric motor is driven so as to rotate in the same direction as the turning direction of the steering shaft, then a steering assist torque is generated. To control this electric motor, the power steering device is provided with an electronic control unit.

As a related art electric power steering device, for instance, an electric power steering device disclosed in Japanese Unexamined Patent Application Publication No. 2019-080468 (Patent Document 1) is known. Patent Document 1 discloses the electric power steering device configured by an electric motor unit and an electronic control unit. An electric motor of the electric motor unit is housed in a motor housing having a tubular portion made of aluminum alloy etc. A mount board of the electronic control unit on which electronic elements or components are mounted is fixed to an end surface wall, which is formed at an opposite side to an output shaft of the electric motor in an axial direction of the motor housing and serves as a heat sink, of the motor housing.

The mount board fixed to the end surface wall mounts thereon a power supply circuit unit, a power conversion circuit unit having a power switching element such as a MOSFET and an IGBT that drive and control the electric motor, and a control circuit unit that controls the power switching element. An output terminal of the power switching element and an input terminal of the electric motor are electrically connected through a bus bar.

Then, power is supplied to the electronic control unit fixed to the end surface wall from a power supply through a connector assembly made of synthetic resin. Further, detection signals concerning an operating state etc. are sent to the electronic control unit from detection sensors. An external terminal forming portion of the connector assembly is exposed to the outside from an exposure hole formed at a metal cover, and is connected to the power supply (a battery) and the detection sensors through a connector (not shown).

The connector assembly is fixed to fixing portions formed at the end surface wall of the motor housing so as to stand from the end surface wall of the motor housing along the axial direction with fixing bolts. The connector assembly is generally fastened together with the mount board so as to sandwich the mount board.

The metal cover is made of metal having bottomed tubular shape whose one end is open. The exposure hole is formed at a flat surface portion of the metal cover, which is on an opposite side to the opening side of the metal cover, then the external terminal forming portion is exposed through the exposure hole. The opening side of the metal cover is fixed to the end surface wall of the motor housing with an adhesive or bolts.

As another electric drive device in which the electronic control unit is integrally mounted, an electric brake and an electric hydraulic pressure controller for various kinds of hydraulic pressure control are known. In the following description, the electric power steering device from among these electric drive devices will be described.

CITATION LIST

Patent Document

Patent Document 1: Japanese Unexamined Patent Application Publication No. 2019-080468

SUMMARY OF THE INVENTION

Technical Problem

As in Patent Document 1 too, in this type of electric power steering device, the electronic control unit has a configuration as shown in FIG. 7.

In FIG. 7, the electronic control unit is placed at a side of an end surface portion 60A of a motor housing 60, and in order from the end surface portion 60A, a power conversion circuit unit 61, a power supply circuit unit 62, a control circuit unit 63 and a connector assembly 64 are arranged. A mount board 65 of the power supply circuit unit 62 is fixed to a step portion of the end surface portion 60A with a fixing bolt 66. Further, the connector assembly 64 is tightened and fixed to fixing portions 68, which stand from the end surface portion 60A, together with amount board 67 of the control circuit unit 63 with fixing bolts (not shown).

An annular seal portion 70 is formed around an external terminal forming portion 69 of the connector assembly 64, and its inside is filled with a well-known liquid sealant (not shown). The annular seal portion 70 is formed at a continuous grooved recess in order to store the liquid sealant. The liquid sealant fills an inside of this recess, and is accommodated inside the recess. This liquid sealant is solidified at room temperature or under heating, then has an adhesive function and a sealing function.

The external terminal forming portion 69 of the connector assembly 64 is exposed to the outside from an exposure hole 73 formed at a flat surface portion 72 of a metal cover 71. That is, the exposure hole 73 through which the terminal forming portion 69 of the connector assembly 64 is exposed to the outside is formed at the flat surface portion 72 formed at one end side of a side peripheral surface portion of the metal cover 71. This exposure hole 73 is formed as a punched hole at the flat surface portion 72 by punching the flat surface portion 72. At a peripheral edge portion of the exposure hole 73, an annular protruding edge portion 74 that is bent to an inner side of the metal cover 71 is formed.

The annular protruding edge portion 74 formed at the peripheral edge portion of the exposure hole 73 is formed into the same shape as the annular seal portion 70 so as to be accommodated in the annular seal portion 70. Therefore, a liquid-tight function is ensured by the annular seal portion 70, the liquid sealant and the annular protruding edge portion 74.

Here, in this type of electric drive device, it is required to reduce a manufacturing unit price. As a method of reducing the manufacturing unit price, reducing a unit price of the connector assembly 64 is effective. And, as one method for that, it is conceivable to use an inexpensive resin material.

However, if the inexpensive resin material is used for the connector assembly 64, as shown in FIG. 7, there occurs a phenomenon in which a warp (warpage) (Wp) indicated by a broken line arrow is formed in a region around the middle of the connector assembly 64. The reason for this is that the inexpensive resin material does not contain an additive that suppresses the warp, or the additive is not sufficiently mixed with the inexpensive resin material. Here, the warp (Wp) may occur not only in the region around the middle, but also in the other region except the middle.

If this warp (Wp) occurs, the following problems occur. When the connector assembly 64 and the metal cover 71 are assembled, a positional relationship between the annular seal portion 70 of the connector assembly 64 and the annular protruding edge portion 74 of the metal cover 71 goes out of an intended designed positional relationship, then good sealing performance cannot be maintained, or even if some degree of sealing performance is secured, a seal distance that works as the sealing function becomes shorter, and the sealing function is lost with the passage of time, then good sealing performance cannot be maintained.

An object of the present invention is therefore to provide a new electric drive device that is capable of securing good sealing performance between the annular seal portion of the connector assembly and the annular protruding edge portion of the cover by correcting the warp of the connector assembly.

Solution to Problem

In the present invention, an electric drive device comprises: a connector assembly having an external terminal forming portion; a cover accommodating therein the connector assembly with the external terminal forming portion being exposed; a seal portion having a seal groove in which the cover and the connector assembly are sealed; and a plurality of fixing portions fixing the connector assembly to a housing, wherein the seal groove is formed in a region that connects the two fixing portions in a straight line.

Effects of Invention

According to the present invention, since the seal groove is formed in the straight region connecting the two fixing portions, the warp of a region where the seal portion is formed is corrected by the fixing portions, thereby securing good sealing performance between the seal portion of the connector assembly and the annular protruding edge portion of the cover.

EMBODIMENTS FOR CARRYING OUT THE INVENTION

An embodiment of the present invention will be described in detail below with reference to the drawings. However, the present invention is not limited to the following embodiment, and includes all design modifications and equivalents belonging to the technical scope of the present invention.

Figure 1:
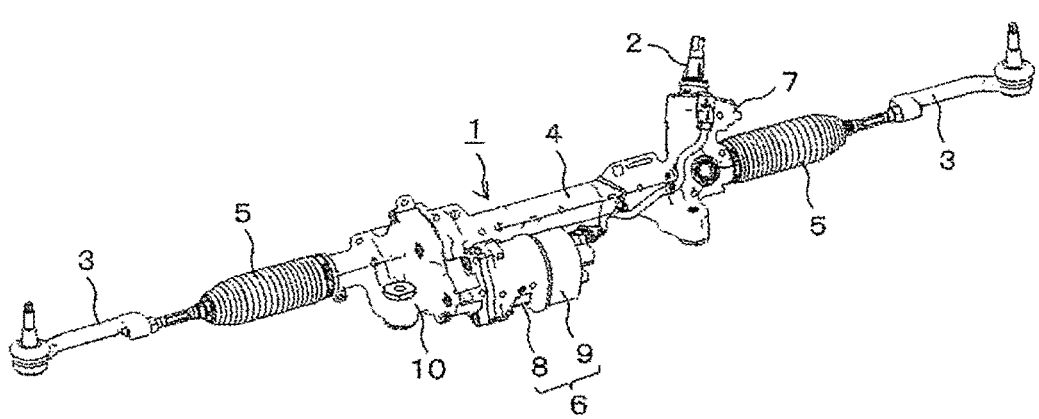
FIG. 1 is a general perspective view of a steering device as an example to which the present invention is applied.

Before describing the embodiment of the present invention, a configuration of a steering device as an example to which the present invention is applied will be briefly described using FIG. 1.

First, a steering device to steer front wheels of a vehicle will be described. A steering device 1 is configured as shown in FIG. 1. A pinion (not shown) is provided at a lower end of a steering shaft 2 connecting to a steering wheel (not shown). This pinion is engaged with a rack (not shown) that extends in right and left directions of a vehicle body. A tie rod 3 to steer the front wheels in the right and left directions is each connected to both ends of the rack. The rack is accommodated in a rack housing 4. Between the rack housing 4 and each tie rod 3, a rubber boot 5 is provided.

The steering device 1 is provided with an electric power steering device 6 to assist torque when performing a turning operation of the steering wheel. That is, a torque sensor 7 that detects a turning direction and a turning torque of the steering shaft 2 is provided. And, an electric motor unit 8 that provides a steering assistive force to the rack via a gear 10 on the basis of a detection value of the torque sensor 7 is provided. Further, an electronic control unit (ECU) 9 that controls an electric motor disposed in the electric motor unit 8 is provided.

The electric motor unit 8 of the electric power steering device 6 is connected to the gear 10 at three portions of an outer periphery at an output shaft side of the electric motor unit 8 with screws (not shown). The electronic control unit 9 is disposed on an opposite side to the output shaft side of the electric motor unit 8.

In the electric power steering device 6, when the steering shaft 2 is turned in any turning direction by the steering wheel operation, the torque sensor 7 detects the turning direction and the turning torque of the steering shaft 2. A control circuit unit calculates a drive operation amount of the electric motor on the basis of these detection values.

The electric motor is then driven by a power switching element of a power conversion circuit unit on the basis of the calculated drive operation amount. And, an output shaft of the electric motor rotates so as to drive and rotate the steering shaft 2 in the same direction as a direction of the steering wheel operation. This rotation of the output shaft of the electric motor is transmitted to the rack (not shown) through the pinion (not shown) and the gear 10, and the vehicle is steered. Since such configuration and workings are well known, a further explanation will be omitted here.

As mentioned above, in order to reduce the manufacturing unit price of the electric drive device (in the embodiment, the electric power steering device), it is conceivable to change the resin material that forms the connector assembly to an inexpensive resin material. However, if the inexpensive resin material is used for the connector assembly, there is a risk that the warp will occur at the connector assembly.

Then, if this warp occurs, there occurs a phenomenon in which when the connector assembly and the metal cover are assembled, a positional relationship between the annular seal portion of the connector assembly and the annular protruding edge portion of the metal cover goes out of an intended designed positional relationship. Consequently, as problems, good sealing performance cannot be maintained, or even if some degree of sealing performance is secured, a seal distance that works as the sealing function becomes shorter, and the sealing function deteriorates with the passage of time, then good sealing performance cannot be maintained.

It is noted that if resin material containing an additive that suppresses the warp is used in order to suppress the warp of the connector assembly, material cost is increased. Further, if a cooling period during molding is lengthened in order to suppress the warp, a molding cycle time becomes longer, then aimed reduction in manufacturing unit price cannot be achieved.

EMBODIMENT

From such background, the embodiment of the present invention proposes an electric power steering device having the following configuration.

That is, in the present embodiment, a connector assembly and a motor housing are fixed with a plurality of fixing portions, and at least a part of an annular seal portion that is formed at the connector assembly so as to surround an external terminal forming portion of the connector assembly is formed in a straight region that connects the two fixing portions. Since the annular seal portion is formed in the straight region connecting the two fixing portions, the warp of a region where the annular seal portion is formed is corrected by the fixing portions, thereby securing good sealing performance between the annular seal portion of the connector assembly and an annular protruding edge portion of a cover.

In the following description, a specific configuration of the electric power steering device according to the embodiment of the present invention will be described in detail with reference to FIGS. 2 to 6.

Figure 2:
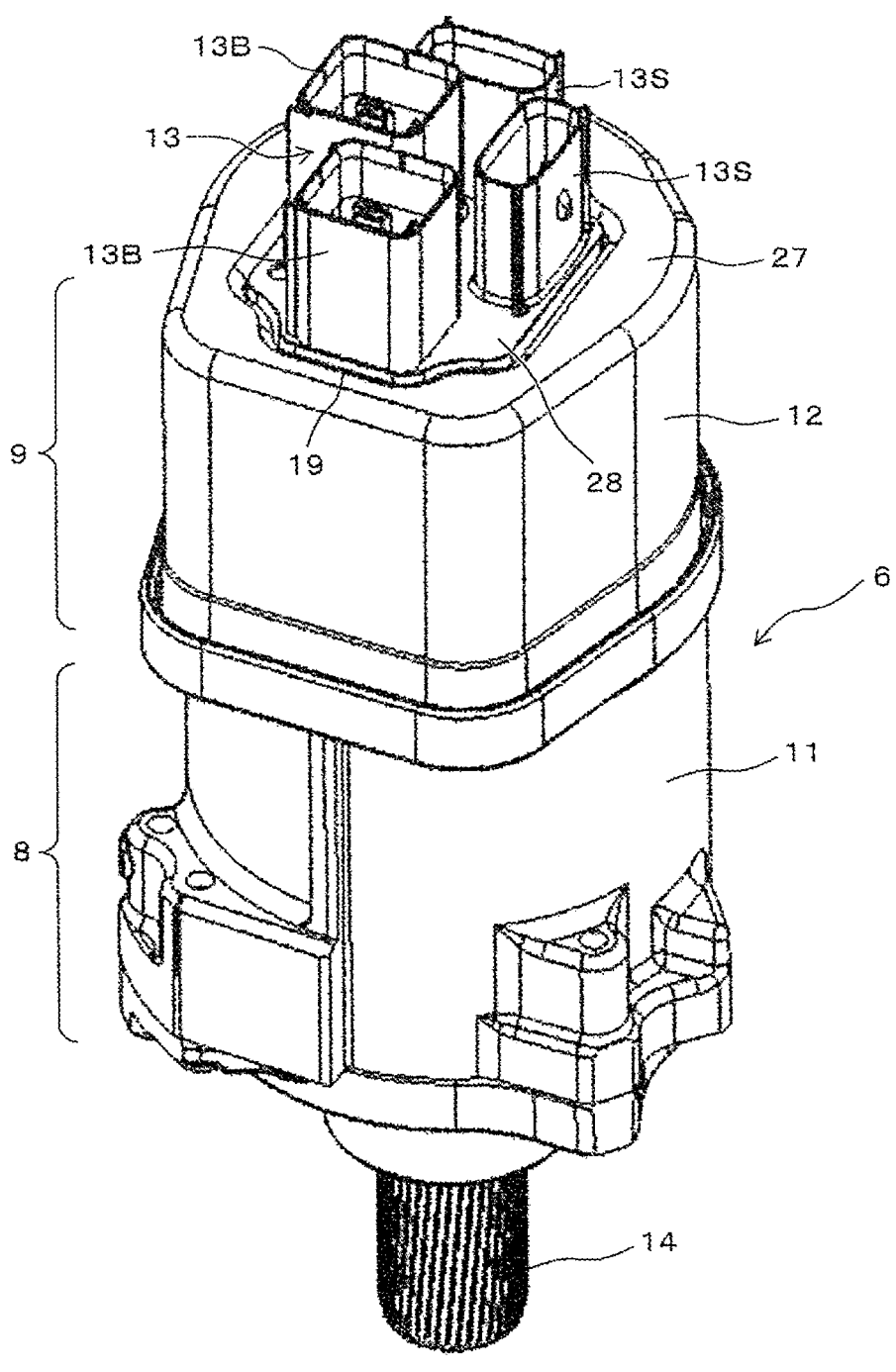
FIG. 2 is a general perspective view of an electric power steering device according to an embodiment of the present invention.
Figure 3:
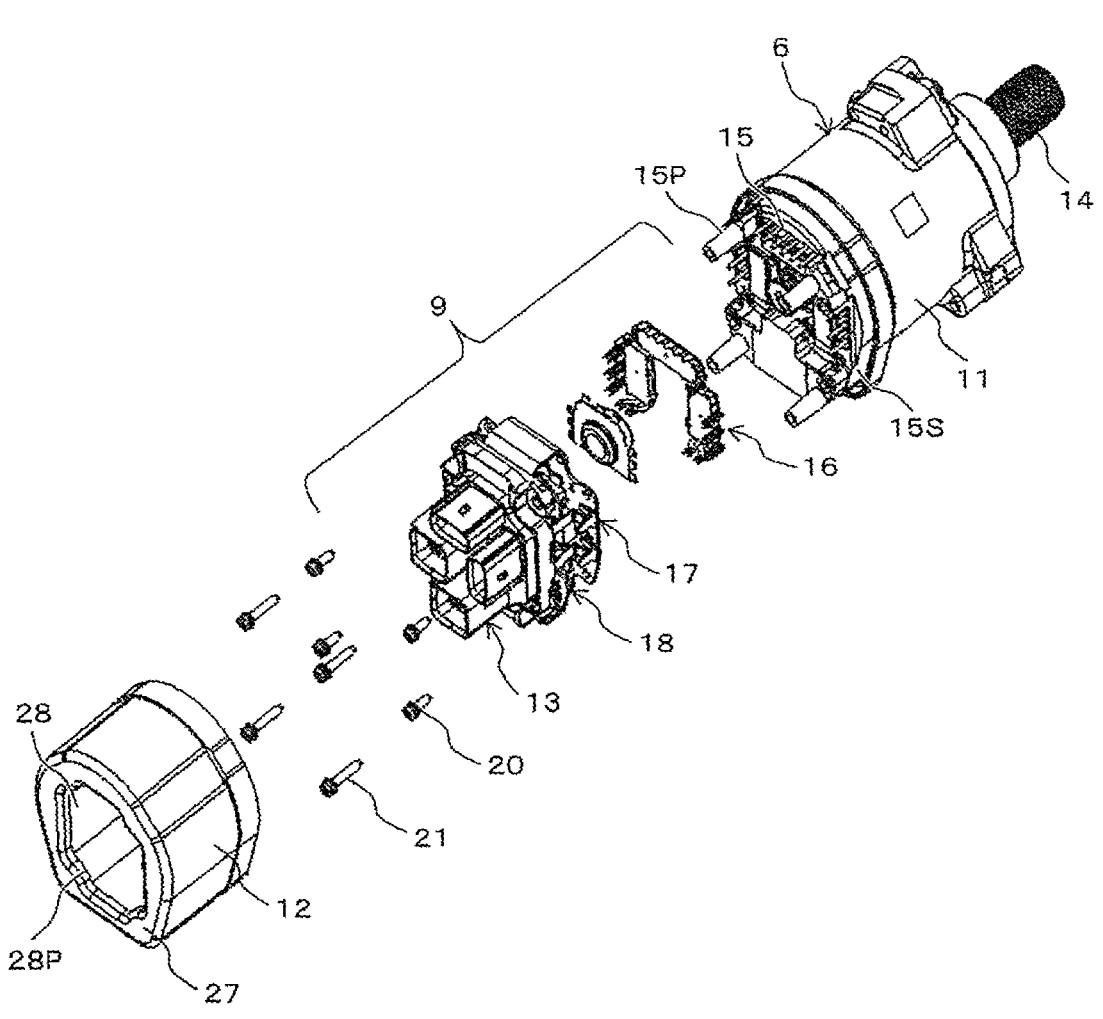
FIG. 3 is a perspective exploded view of the electric power steering device shown in FIG. 2.
Figure 4:
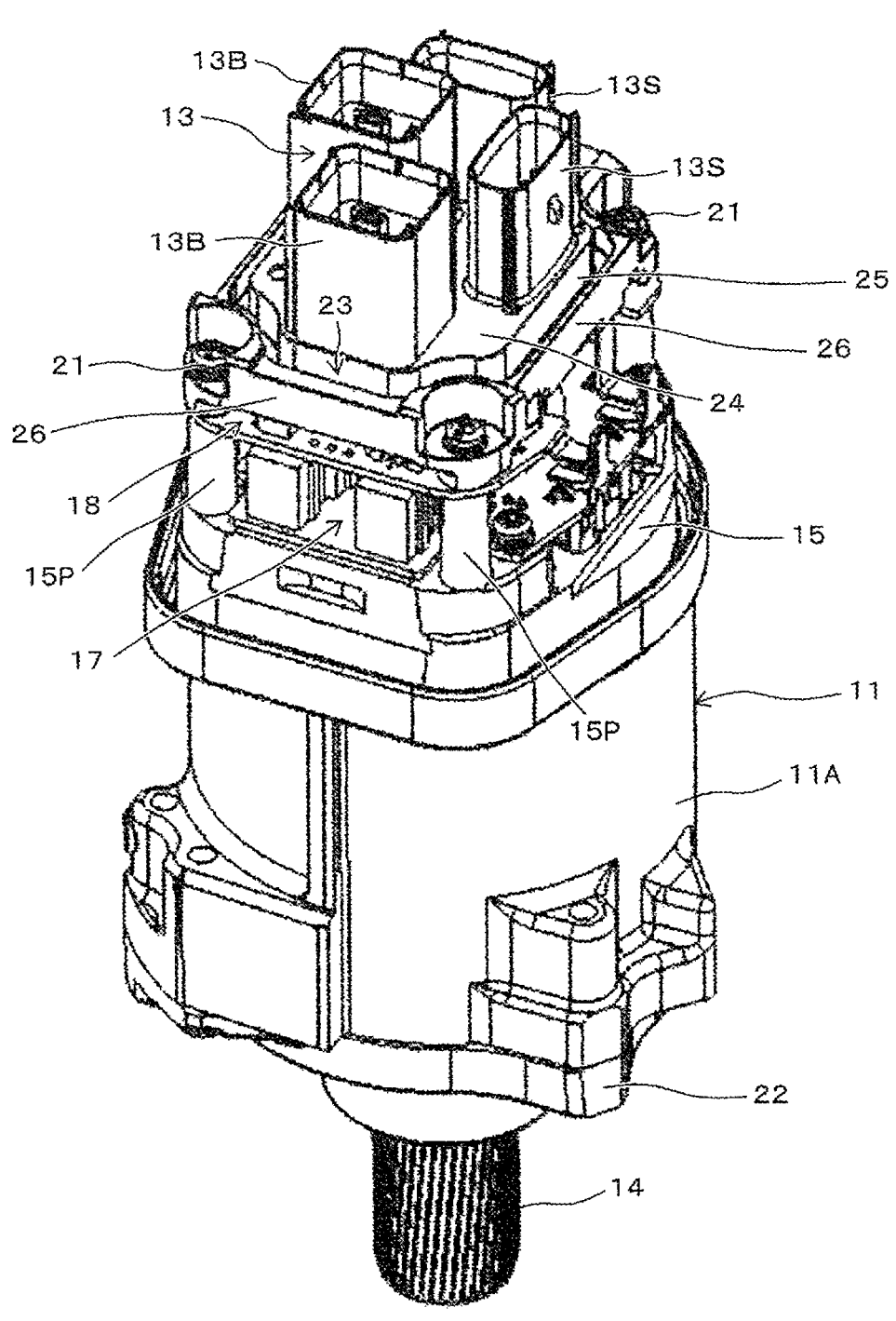
FIG. 4 is a general perspective view of the electric power steering device shown in FIG. 2 with a metal cover removed from the electric power steering device. Here, indication of fixing bolts of a connector assembly is omitted.
Figure 5:
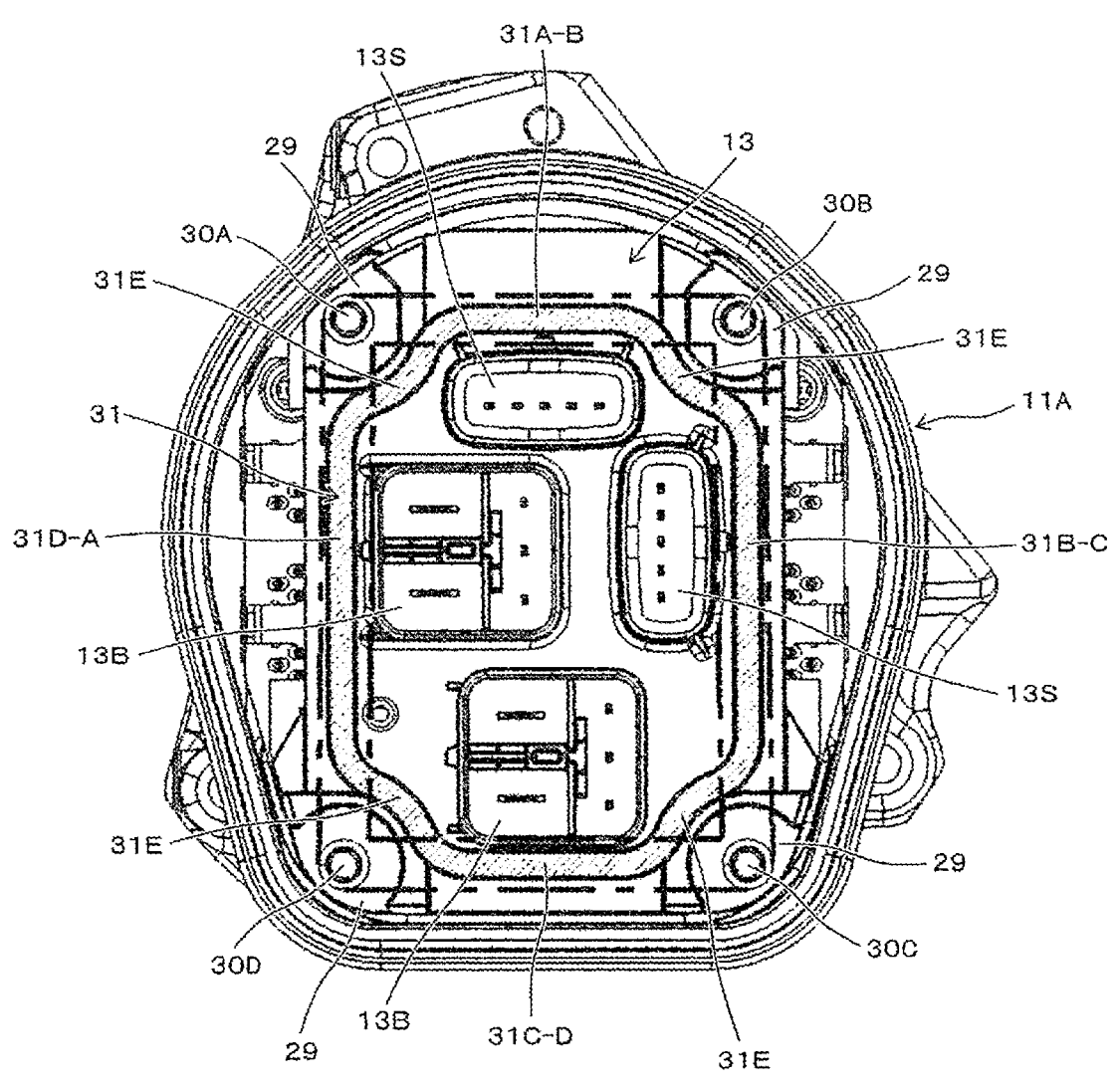
FIG. 5 is a top view of the electric power steering device shown in FIG. 4, which is viewed from an axial direction.
Figure 6:
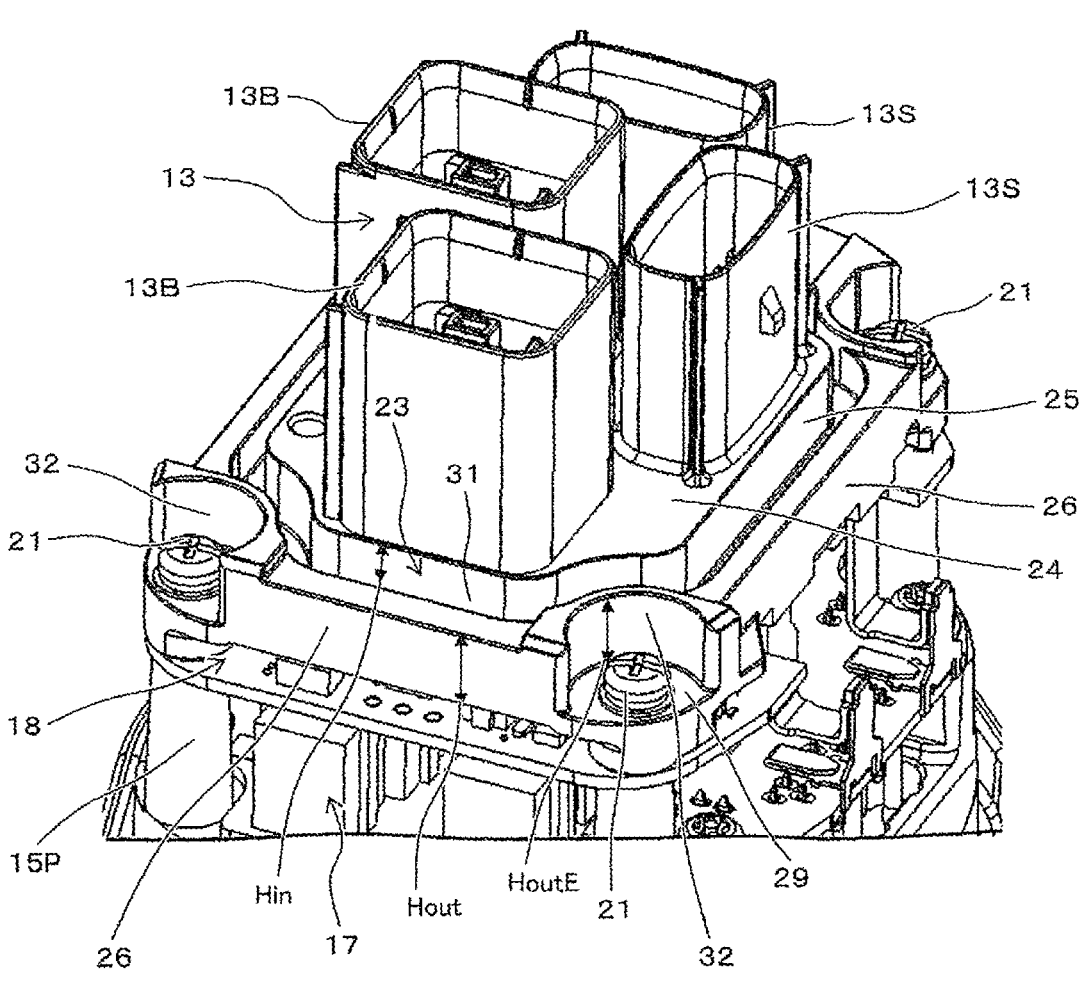
FIG. 6 is an enlarged perspective view of a vicinity of the connector assembly of the electric power steering device shown in FIG. 4.

FIG. 2 is a drawing showing a general configuration of the electric power steering device of the present embodiment. FIG. 3 is a drawing of components of the electric power steering device shown in FIG. 2 with the components dismantled, which is viewed from an oblique direction. FIG. 4 is a drawing showing the general configuration of the electric power steering device with a metal cover removed. FIG. 5 is a drawing of the electric power steering device shown in FIG. 4, which is viewed from an axial direction. FIG. 6 is an enlarged view of a vicinity of a connector assembly of the electric power steering device shown in FIG. 4. In the following description, the configuration will be described using the drawings as appropriate.

As shown in FIG. 2, an electric motor unit 8 forming the electric power steering device 6 is configured by a motor housing 11 having a tubular portion made of aluminum alloy etc. and an electric motor (not shown) accommodated in the motor housing 11.

An electronic control unit 9 is configured by a metal cover 12 made of metal material such as aluminum alloy and located at an opposite side to an output portion 14 of the electric motor in an axial direction of the motor housing 11 and electronic control components or elements (not shown) accommodated in this metal cover 12. Here, the metal cover 12 may be a synthetic resin-made cover, but in the following description, the cover 12 will be described as the metal cover.

The motor housing 11 and the metal cover 12 are fixedly connected to each other at their opposing end surfaces with an adhesive or fixing bolts or by welding. An end surface portion of the motor housing 11 and the metal cover 12 form an accommodation space. More specifically, an accommodation space in which the electronic control unit is accommodated is formed inside the metal cover 12.

Figure 7:
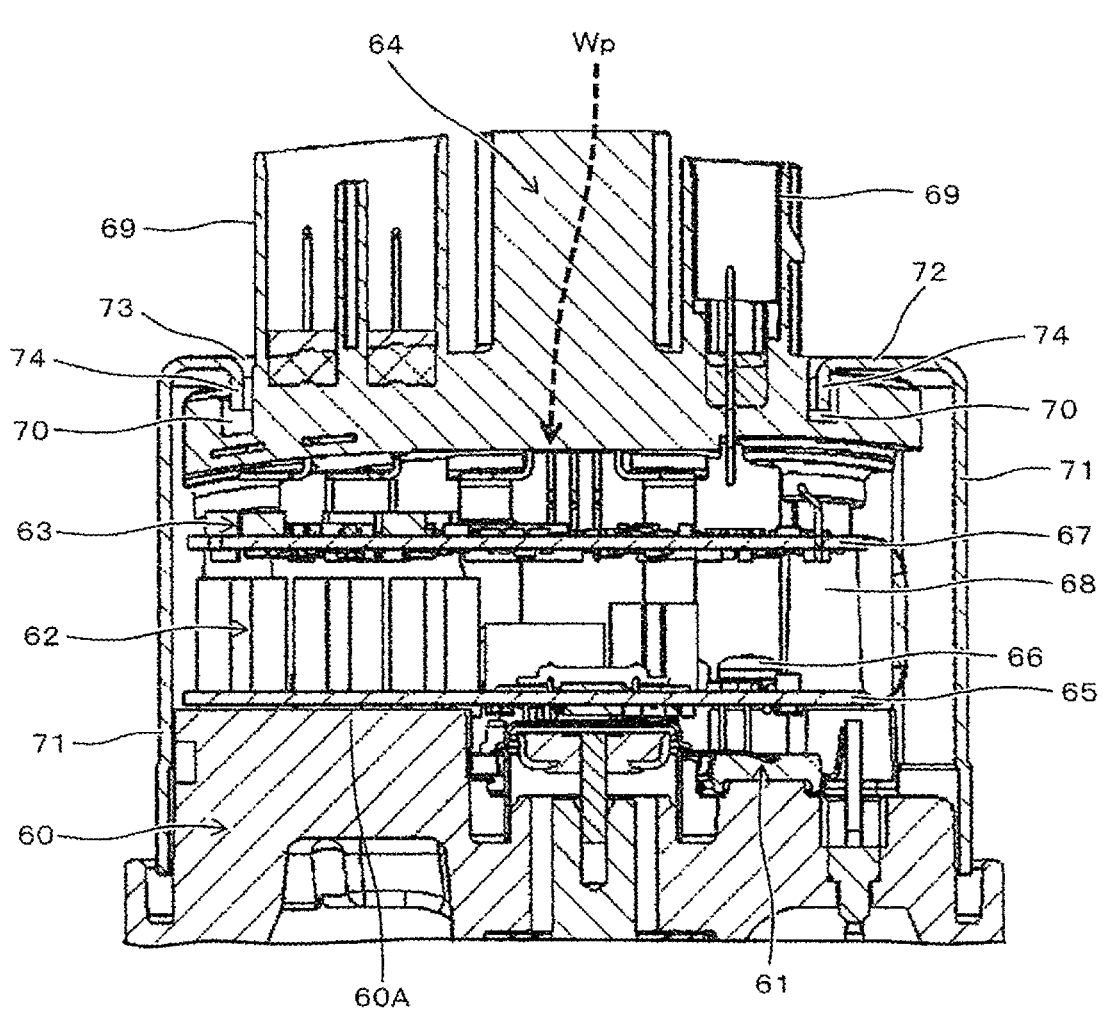
FIG. 7 is a sectional view of a vicinity of an electronic control unit of a related art electric power steering device, which is cut in the axial direction.

The electronic control components or elements accommodated in this accommodation space are configured by a power supply circuit unit that generates a required power, a power conversion circuit unit having a power switching element such as a MOSFET and an IGBT that drive and control the electric motor of the electric motor unit 8, and a control circuit unit that controls the power switching element. An output terminal of the power switching element and an input terminal of a coil of the electric motor are electrically connected through a bus bar. These configurations are basically the same as those of the electronic control unit shown in FIG. 7.

The electronic control unit forms a redundant system, and if one control unit fails, the operation is maintained by the other control system. Because of the redundant system, external terminal forming portions 13B and 13S of a connector assembly 13 are also configured as the redundant system.

At a side of an opening end surface of the metal cover 12, the connector assembly 13 is fixed to the motor housing 11 with fixing bolts. The connector assembly 13 has the external terminal forming portions 13B for power supply as the redundant system and the external terminal forming portions 13S for the torque sensor as the redundant system, each of which stands from a flat surface region. The electronic control unit accommodated in the metal cover 12 is supplied with power from a power supply through the synthetic resin-made external terminal forming portion 13B for power supply. Further, the electronic control unit is provided with detection signals from the torque sensor through the external terminal forming portion 13S for the torque sensor.

An exposure hole 28 through which the external terminal forming portions 13B and 13S are exposed to the outside is formed at a flat surface portion 27 of the metal cover 12 which is located at an outer side of the metal cover 12 and at an opposite side to the end surface portion of the motor housing 11. Further, a seal portion 19 for sealing in cooperation with the connector assembly 13 is formed at the exposure hole 28. A structure of this seal portion 19 is basically the same as a structure shown in FIG. 7. However, in the present embodiment, a forming position of an annular seal groove that forms this seal portion 19 is different from that shown in FIG. 7, which is a feature of the present embodiment. This will be described in detail later.

FIG. 3 shows an exploded view of the electric power steering device 6, viewed from an oblique direction. An iron-made annular side yoke (not shown) is fitted to an inside of the motor housing 11. The electric motor is accommodated inside this side yoke. The output portion 14 of the electric motor provides the steering assistive force to the rack via the gear. Since a specific structure of the electric motor is well known, its description will be omitted here.

The motor housing 11 is made of aluminum alloy, and acts as a heat sink member that radiates or releases heat generated at the electric motor and heat generated in the power supply circuit unit and the power conversion circuit unit to the outside atmosphere. The electric motor and the motor housing 11 form the electric motor unit.

The electronic control unit 9 is adjacently connected to an end surface portion 15, located at an opposite side to the output portion 14 of the electric motor unit, of the motor housing 11. The electronic control unit 9 has the power conversion circuit unit 16, the power supply circuit unit 17, the control circuit unit 18 and the connector assembly 13. The end surface portion 15 of the motor housing 11 is formed integrally with the motor housing 11. However, the end surface portion 15 could be formed separately from the motor housing 11, then fixed to the motor housing 11 with bolts or by welding.

Here, the power conversion circuit unit 16, the power supply circuit unit 17 and the control circuit unit 18 form a redundant system (a dual-redundancy system) by a main electronic control unit and a sub-electronic control unit. In a normal condition, the electric motor is driven and controlled by the main electronic control unit. However, if an abnormal condition or a failure occurs at the main electronic control unit, the control is switched to the sub-electronic control unit, and the electric motor is driven and controlled by the sub-electronic control unit.

Further, unlike this redundant system, both of the main electronic control unit and the sub-electronic control unit could operate as a regular electronic control unit. And, if the abnormal condition or the failure occurs at one of the electronic control units, the other electronic control unit drives and controls the electric motor by half ability. In this case, although capability of the electric motor is half, a power steering function is secured.

As mentioned above, the electronic control unit 9 is configured by the control circuit unit 18, the power supply circuit unit 17, the power conversion circuit unit 16 and the connector assembly 13. These power conversion circuit unit 16, power supply circuit unit 17, control circuit unit 18 and connector assembly 13 are arranged in this order from the end surface portion 15 side of the motor housing 11 to a direction moving away from the end surface portion 15 of the motor housing 11.

The control circuit unit 18 is a unit that generates a control signal for driving the switching element of the power conversion circuit unit 16, and is configured by a microcomputer and a peripheral circuit and so on. The power supply circuit unit 17 is a unit that generates power to drive the control circuit unit 18 and power for the power conversion circuit unit 16, and is configured by a capacitor, a coil and a switching element and so on. The power conversion circuit unit 16 is a unit that controls power (current) flowing in the coil of the electric motor, and is configured by a switching element that forms three-phase upper and lower arms and so on.

The synthetic resin-made connector assembly 13 is arranged between the control circuit unit 18 and the metal cover 12, and is connected to a vehicle battery (the power supply) that supplies power, and also is connected to the torque sensor that detects the turning torque of the steering wheel so as to be able to communicate with the torque sensor. Needless to say, the connector assembly 13 is connected to the power conversion circuit unit 16, the power supply circuit unit 17 and the control circuit unit 18.

The annular seal groove forming the annular seal portion is formed around the external terminal forming portions 13B and 13S (see FIG. 2) of the connector assembly 13. The annular seal groove is formed at a continuous recess. A liquid sealant fills an inside of this recess, and is accommodated inside the recess. This liquid sealant is solidified at room temperature or under heating, then has an adhesive function and a sealing function. A configuration or structure of this seal groove will be described later.

The power supply circuit unit 17 is fixed to the end surface portion 15 of the motor housing 11 with shorter fixing bolts 20, and the connector assembly 13 and the control circuit unit 18 are fixed to the end surface portion 15 of the motor housing 11 with longer fixing bolts 21. The fixing bolts 21 are screwed into bolt fixing protrusions 15P that are formed at the end surface portion 15 so as to stand at the end surface portion 15, and fix the connector assembly 13 and the control circuit unit 18 to the motor housing 11.

The metal cover 12 has the function of accommodating and liquid-tightly sealing the power conversion circuit unit 16, the power supply circuit unit 17 and the control circuit unit 18. In the present embodiment, the metal cover 12 adheres to and is fixed to an outer peripheral surface 15S of the end surface portion 15 of the motor housing 11 with the liquid sealant.

The exposure hole 28 through which the external terminal forming portions 13B and 13S of the connector assembly 13 are exposed to the outside is formed at the flat surface portion 27 formed at one end side of a side peripheral surface portion of the metal cover 12. This exposure hole 28 is formed as a punched hole at the flat surface portion 27 by punching the flat surface portion 27. At a peripheral edge portion of the exposure hole 28, an annular protruding edge portion 28P that is bent to an inner side of the metal cover 12 is formed. This annular protruding edge portion 28P has the same structure as that of the annular protruding edge portion shown in FIG. 7.

The annular protruding edge portion 28P formed at the peripheral edge portion of the exposure hole 28 is formed into the same shape as the annular seal groove so as to be accommodated in the annular seal groove. Therefore, a liquid-tight function is ensured by the annular seal groove, the liquid sealant and the annular protruding edge portion 28P.

The above liquid sealant is a substance that generally has fluidity at room temperature, dries or is made uniform after a certain time by being applied to joint surfaces, and forms an elastic film or an adhesive film. Therefore, the liquid sealant has the function of maintaining water-tightness of a joint portion and the heat resistance function.

Further, since the metal cover 12 is made of metal, the metal cover 12 has the function of radiating or releasing heat generated by the power conversion circuit unit 16 and the power supply circuit unit 17 etc. to the outside from the metal cover 12.

Next, a configuration of the electronic control unit 9 will be described in detail with reference to FIG. 4. In FIG. 4, the motor housing 11 is shaped into a cylindrical or tubular shape. The motor housing 11 has a side peripheral surface portion 11A, the end surface portion 15 that closes one end of the side peripheral surface portion 11A and an end surface portion 22 that closes the other end of the side peripheral surface portion 11A. In the present embodiment, the side peripheral surface portion 11A and the end surface portion 15 are formed integrally with each other, then the motor housing 11 has a bottomed cylindrical shape. The end surface portion 22 serves as a lid, and closes the other end of the side peripheral surface portion 11A after accommodating the electric motor in the side peripheral surface portion 11A.

A stator having cores around which coils are wound is fitted in the side peripheral surface portion 11A, and a rotor in which a permanent magnet is embedded is rotatably accommodated inside this stator. A rotation shaft is fixed to the rotor, and its one end is the output portion 14, and its other end is a rotation detection portion for detecting a rotation phase and a rotation speed of the rotation shaft.

At four corners of the end surface portion 15 located at an opposite side to the output portion 14, the bolt fixing protrusions 15P are formed integrally with the end surface portion 15 so as to stand at the end surface portion 15, and a screw hole is formed at an inside of each bolt fixing protrusion 15P. The bolt fixing protrusions 15P are provided for fixing a board of the control circuit unit 18 and the connector assembly 13.

The power supply circuit unit 17 has the capacitors and the coils and so on, and these are mounted on a glass epoxy board. The power supply circuit unit 17 has the redundant system, and power supply circuits configured by the capacitors and the coils etc., which are arranged symmetrically with respect to each other, are formed on the glass epoxy board. This glass epoxy board is fixed to screw holes formed at the end surface portion 15 with the fixing bolts 20 (see FIG. 3).

The control circuit unit 18 is mounted above or over the power supply circuit unit 17. The microcomputers and the peripheral circuits which form the control circuit unit 18 are mounted on a glass epoxy board. The control circuit unit 18 also has the redundant system, and control circuits configured by the microcomputers and the peripheral circuits, which are arranged symmetrically with respect to each other, are formed on the glass epoxy board. This glass epoxy board is fixed to screw holes provided at tops of the bolt fixing protrusions 15P with the fixing bolts 21 with the glass epoxy board sandwiched by the connector assembly 13.

As shown in FIG. 2, the external terminal forming portions 13B and 13S of the connector assembly 13 are exposed to the outside through the exposure hole 28 formed at the flat surface portion 27 located at an opposite side to the opening end surface of the metal cover 12. That is, the exposure hole 28 through which the external terminal forming portions 13B and 13S of the connector assembly 13 are exposed to the outside is formed at the flat surface portion 27 formed at one end side of the side peripheral surface portion of the metal cover 12.

This exposure hole 28 is formed as the punched hole at the flat surface portion 27 by punching the flat surface portion 27, as shown in FIG. 2. At the peripheral edge portion of the exposure hole 28, the annular protruding edge portion (not shown) that is bent to the inner side of the metal cover 12 is formed. Since a shape of the annular protruding edge portion is basically the same as that shown in FIG. 7, a detailed description will be omitted here.

The annular seal portion 23 is formed around the external terminal forming portions 13B and 13S of the connector assembly 13 so as to surround the external terminal forming portions 13B and 13S, and its inside is filled with a well-known liquid sealant (not shown). The annular seal portion 23 is formed at a continuous grooved recess in order to store the liquid sealant. The liquid sealant fills an inside of this recess, and is accommodated inside the recess. This liquid sealant is solidified at room temperature or under heating, then has an adhesive function and a sealing function.

The annular seal portion 23 is formed in the flat surface region 24 where the external terminal forming portions 13B and 13S are formed. The annular seal portion 23 is formed by an inner side wall surface portion 25, an outer side wall surface portion 26 and the annular seal groove formed between these wall surface portions 25 and 26. A detailed configuration of the annular seal portion 23 will be described later.

The annular protruding edge portion formed at the peripheral edge portion of the exposure hole 28 of the metal cover 12 is formed into the same shape as the annular seal groove so as to be accommodated in the annular seal groove. The annular protruding edge portion is then accommodated inside the annular seal groove with the annular protruding edge portion entering the annular seal groove. Therefore, a liquid-tight function is ensured by the annular seal groove, the liquid sealant and the annular protruding edge portion. This configuration is the same as the configuration of FIG. 7.

Next, a specific configuration of the annular seal portion 23 will be described in detail. First, in FIG. 5, flat fixing bolt arrangement regions 29 are formed at four positions located close to an outer periphery of the connector assembly 13. Penetration holes 30A to 30D into which the fixing bolts 21 are inserted are formed in these fixing bolt arrangement regions 29. The fixing bolts 21 are inserted into these penetration holes 30A to 30D, and screwed into the bolt fixing protrusions 15P.

Then, straight sections of the annular seal groove 31 (shown by hatching in FIG. 5) forming the annular seal portion 23 are formed along straight seal groove forming regions (shown by a dashed line in FIG. 5) that connect adjacent fixing portions of the connector assembly 13, i.e. the adjacent penetration holes 30A to 30D of the fixing bolts 21.

It is noted that these seal groove forming regions include the penetration holes 30A to 30D, and each seal groove forming region is determined so that a width of an inner side of the seal groove forming region with respect to a line segment that connects centers of the adjacent penetration holes 30A to 30D is set to be longer (wider) than a width of an outer side of the seal groove forming region. This seal groove forming region is merely a virtual region.

The above annular seal groove 31 is a groove formed between the inner side wall surface portion 25 and the outer side wall surface portion 26 shown in FIG. 4. As shown in FIG. 5, in the present embodiment, a straight seal groove 31A-B is arranged so as to overlap a line segment that connects the centers of the adjacent penetration holes 30A and 30B, and a positional relationship between a center line of the straight seal groove 31A-B along the straight seal groove 31A-B and the above line segment is determined so as to overlap each other or so as to be close to each other when viewed in an axial direction. Here, the axial direction refers to an axial direction in which the rotation shaft of the electric motor extends.

Further, in an area where the warp of the connector assembly 13 is allowed, it is not necessary for the line segment connecting the centers of the penetration holes 30A and 30B and the center line of the straight seal groove 31A-B along the straight seal groove 31A-B to overlap each other, but a part of width in a radial direction of the straight seal groove 31A-B and the line segment connecting the centers of the penetration holes 30A and 30B overlap each other.

In this way, by arranging the straight seal groove 31A-B in the straight seal groove forming region connecting the adjacent penetration holes 30A and 30B into which the fixing bolts 21 are inserted, the warp of a region, where the straight seal groove 31A-B is formed, of the connector assembly 13 is suppressed by a fastening force of the fixing bolt 21, and the warp can be corrected.

For instance, in a case where the straight seal groove is formed at an inner side or an outer side with respect to the above seal groove forming region, the warp of the seal groove forming region where the straight seal groove is not formed is suppressed by the fastening force of the fixing bolt 21. However, the fastening force of the fixing bolt 21 is not sufficiently exerted on a region, located at the inner side or the outer side with respect to this seal groove forming region, of the straight seal groove, then the warp cannot be suppressed, and as a consequence, the warp remains.

Consequently, a positional relationship between the straight seal groove of the connector assembly and the annular protruding edge portion of the metal cover goes out of an intended designed positional relationship, then the problem as described in a section of the technical problem to be solved by the invention occurs. The same goes for the other straight seal grooves described below.

In the same manner as the straight seal groove 31A-B, a straight seal groove 31B-C is arranged so as to overlap a line segment that connects the centers of the adjacent penetration holes 30B and 30C, and a positional relationship between a center line of the straight seal groove 31B-C along the straight seal groove 31B-C and the above line segment is determined so as to overlap each other or so as to be close to each other when viewed in the axial direction. Also in the case of this straight seal groove 31B-C, the warp of a region, where the straight seal groove 31B-C is formed, of the connector assembly 13 is suppressed by the fastening force of the fixing bolt 21, and the warp can be corrected.

Further, a straight seal groove 31C-Dis arranged so as to overlap a line segment that connects the centers of the adjacent penetration holes 30C and 30D, and a positional relationship between a center line of the straight seal groove 31C-D along the straight seal groove 31C-D and the above line segment is determined so as to overlap each other or so as to be close to each other when viewed in the axial direction. Also in the case of this straight seal groove 31C-D, the warp of a region, where the straight seal groove 31C-D is formed, of the connector assembly 13 is suppressed by the fastening force of the fixing bolt 21, and the warp can be corrected.

Furthermore, a straight seal groove 31D-A is arranged so as to overlap a line segment that connects the centers of the adjacent penetration holes 30D and 30A, and a positional relationship between a center line of the straight seal groove 31D-A along the straight seal groove 31D-A and the above line segment is determined so as to overlap each other or so as to be close to each other when viewed in the axial direction. Also in the case of this straight seal groove 31D-A, the warp of a region, where the straight seal groove 31D-A is formed, of the connector assembly 13 is suppressed by the fastening force of the fixing bolt 21, and the warp can be corrected.

Also in the cases of these straight seal grooves 31B-C, 31C-D and 31D-A, in an area where the warp of the connector assembly 13 is allowed, it is not necessary for the line segments connecting the centers of the adjacent penetration holes 30A to 30D and the respective center lines of the straight seal grooves 31B-C, 31C-D and 31D-A along the straight seal grooves 31B-C, 31C-D and 31D-A to overlap each other, but a part of width in a radial direction of each of the straight seal grooves 31B-C, 31C-D and 31D-A and the respective line segments connecting the centers of the adjacent penetration holes 30A to 30D overlap each other.

In this way, by arranging the straight seal grooves 31A-B, 31B-C, 31C-D and 31D-A in the straight seal groove forming regions connecting the adjacent penetration holes 30A and 30D into which the fixing bolts 21 are inserted, the warp of regions, where the straight seal grooves 31A-B, 31B-C, 31C-D and 31D-A are formed, of the connector assembly 13 is suppressed by the fastening force of the fixing bolt 21, and the warp can be corrected.

Then, the straight seal grooves 31A-B and 31B-C, the straight seal grooves 31B-C and 31C-D, the straight seal grooves 31C-D and 31D-A, and the straight seal grooves 31D-A and 31A-B, are each connected by inward-protruding rounded seal grooves 31E, here, inward-protruding arc-shaped seal grooves 31E, and the entirely closed annular seal groove 31 is formed.

Each arc-shaped seal groove 31E is formed in a region of the fixing bolt arrangement region 29 where the fixing bolt 2*l* is inserted. The arc-shaped seal groove 31E has a shape that protrudes inwards in accordance with a shape of a head of the fixing bolt 21. The arc-shaped seal grooves 31E are provided in vicinities where extension lines of the straight seal grooves 31A-B, 31B-C, 31C-D and 31D-A intersect.

Since the arc-shaped seal groove 31E is formed close to the fixing bolt 21, even if the warp occurs at the connector assembly 13, the warp is corrected by the fastening force of the fixing bolt 21, as mentioned above.

Next, detailed configurations of the inner side wall surface portion 25 and the outer side wall surface portion 26 which form the annular seal groove 31 will be described.

In FIG. 6, the annular seal groove 31 formed by the inner side wall surface portion 25 and the outer side wall surface portion 26 is formed in the flat surface region 24 around the external terminal forming portions 13B and 13S so as to surround the external terminal forming portions 13B and 13S of the connector assembly 13. This annular seal groove 31 is formed, as shown in FIG. 5 described above, by the straight seal grooves 31A-B, 31B-C, 31C-D and 31D-A and the arc-shaped seal grooves 31E connecting these straight seal grooves 31A-B, 31B-C, 31C-D and 31D-A.

The outer side wall surface portion 26 forming the straight seal grooves 31A-B, 31B-C, 31C-D and 31D-A and the arc-shaped seal grooves 31E is continuously or seamlessly formed integrally with the connector assembly 13, then the strength of the outer side wall surface portion 26 is increased. In particular, an outer side arc wall surface portion 32 that forms the arc-shaped seal groove 31E is shaped into an arc shape. Therefore, it is possible to secure the strength against a load when the metal cover 12 is combined and integrated.

Further, a height (Hout) of the outer side wall surface portion 26 from a bottom surface of the annular seal groove 31 is set to be higher than a height (Hin) of the inner side wall surface portion 25 from the bottom surface of the annular seal groove 31, thereby suppressing leakage of excess liquid sealant to the mount board side. Also, since the height (Hin) of the inner side wall surface portion 25 from the bottom surface of the annular seal groove 31 is lower, excess liquid sealant flows to the flat surface region 24 of the connector assembly 13, and the liquid sealant has a swelling shape (the liquid sealant swells) between the annular protruding edge portion 28P (see FIG. 7) of the metal cover 12 and the inner side wall surface portion 25. With this, no boundary surface is formed between the liquid sealant and the annular protruding edge portion 28P of the metal cover 12, thereby reducing salt damage due to inflow of salt water.

Further, a height (HoutE) of the outer side arc wall surface portion 32 forming the arc-shaped seal groove 31E is set to be higher than the height (Hout) of the outer side wall surface portion 26 from the bottom surface of the annular seal groove 31, and a back surface of the flat surface portion 27 of the metal cover 12 contacts the outer side arc wall surface portion 32 when the metal cover 12 is combined, then positioning of the metal cover 12 is made. Therefore, the outer side arc wall surface portion 32 forms the arc-shaped seal groove 31E, and as a positioning portion, can make positioning of the metal cover 12. In this way, it is possible to fulfill a plurality of functions at the same time and contribute to miniaturization or size reduction.

In addition, since the outer side arc wall surface portion 32 has the arc shape, the outer side arc wall surface portion 32 can sufficiently withstand a pressing force from the metal cover 12. An accurate positioning of the metal cover 12 can therefore be made without damaging the positioning portions.

As described above, in the present invention, the electric drive device comprises: the connector assembly having the external terminal forming portion; the cover accommodating therein the connector assembly with the external terminal forming portion being exposed; the seal portion having the seal groove in which the cover and the connector assembly are sealed; and the plurality of fixing portions fixing the connector assembly to the housing, wherein the seal groove is formed in a region that connects the two fixing portions in a straight line.

According to this configuration, since the seal groove is formed in the straight region connecting the two fixing portions, the warp of a region where the seal portion is formed is corrected by the fixing portions, thereby securing good sealing performance between the seal portion of the connector assembly and the annular protruding edge portion of the cover.

The present invention is not limited to the above embodiment, and includes all design modifications. The above embodiment is an embodiment that is described in detail to easily understand the present invention, and the present invention is not necessarily limited to the embodiment having all elements or components described above. Further, a part of the configuration of the embodiment can be replaced with a configuration of other embodiments. Also, the configuration of other embodiments could be added to the configuration of the embodiment. Moreover, regarding a part of the configuration of the embodiment, the configuration of other embodiments could be added, removed and replaced.

The invention claimed is:

1. An electric drive device comprising:
a connector assembly having an external terminal forming portion;
a cover accommodating therein the connector assembly with the external terminal forming portion being exposed;
a seal portion formed integrally with the connector assembly and having a seal groove in which the cover and the connector assembly are sealed; and
a plurality of fixing portions provided at the connector assembly and fixing the connector assembly to a housing,
wherein the seal groove is formed in a region that connects the two fixing portions in a straight line.

2. The electric drive device as claimed in claim 1, wherein the seal groove of the seal portion is formed by straight portions formed in a straight line and curved portions seamlessly connecting to the straight portions and changing an orientation of a longitudinal direction of the seal groove,
the fixing portion is formed by a penetration hole penetrating the connector assembly and a connecting member inserted into the penetration hole and connected to the housing, and
a part of the penetration hole is positioned on an extension line of the straight portion of the seal groove.

3. The electric drive device as claimed in claim 2, wherein a part of the penetration hole is positioned in a vicinity where the extension lines of the two straight portions intersect.

4. The electric drive device as claimed in claim 3, wherein the seal groove is formed by an outer side wall surface portion and an inner side wall surface portion which are formed at the connector assembly, and
a height of the outer side wall surface portion is higher than a height of the inner side wall surface portion.

5. The electric drive device as claimed in claim 4, wherein a positioning portion that contacts the cover is formed at the outer side wall surface portion that forms the curved portion of the seal groove.

6. The electric drive device as claimed in claim 5, wherein the outer side wall surface portion forming the curved portion and the outer side wall surface portion of the straight portion are seamlessly formed,
a height of the outer side wall surface portion forming the curved portion is set to be higher than a height of the outer side wall surface portion of the straight portion, and
the penetration hole is formed close to the curved portion.

7. An electric drive device comprising:
a motor housing accommodating therein an electric motor that drives a mechanical control element;
an electronic control unit provided at an end surface portion, located at an opposite side to an output portion of a rotation shaft of the electric motor, of the motor housing;
a connector assembly provided at the electronic control unit on an opposite side to the end surface portion of the motor housing, the connector assembly having, around an external terminal forming portion, an annular-grooved seal portion formed integrally with the connector assembly and having an annular seal groove that is filled with a liquid sealant, and penetration holes which are formed integrally with the connector assembly and into which fixing bolts for fixing the connector assembly to the end surface portion of the motor housing are inserted; and
a metal cover covering the electronic control unit from an outside, the metal cover having an exposure hole through which the external terminal forming portion is exposed to the outside, a flat surface portion having an annular protruding edge portion that is formed at a peripheral edge portion of the exposure hole and accommodated in the annular seal groove and a side peripheral surface portion forming an opening end that is fixed to the end surface portion of the motor housing,
wherein the connector assembly and the motor housing are fixed with the plurality of fixing bolts, and
wherein straight seal grooves that form the annular seal groove formed at the connector assembly so as to surround the external terminal forming portion of the connector assembly are formed in respective straight seal groove forming regions that connect adjacent penetration holes.

8. The electric drive device as claimed in claim 7, wherein the annular seal groove is a recessed groove formed between an inner side wall surface portion and an outer side wall surface portion which are formed in a flat surface region of the connector assembly.

9. The electric drive device as claimed in claim 8, wherein the straight seal groove is formed so as to overlap a line segment that connects centers of the adjacent penetration holes.

10. The electric drive device as claimed in claim 9, wherein a positional relationship between the line segment connecting the centers of the adjacent penetration holes and a center line of the straight seal groove along the straight seal groove is determined so as to overlap each other or so as to be close to each other when viewed in an axial direction in which the rotation shaft of the electric motor extends.

11. The electric drive device as claimed in claim 10, wherein the annular seal groove is formed by the straight seal grooves formed in the straight seal groove forming regions connecting the adjacent penetration holes and arc-shaped seal grooves that connect adjacent straight seal grooves.

12. The electric drive device as claimed in claim 11, wherein a height of the outer side wall surface portion forming the straight seal groove and the arc-shaped seal groove is set to be higher than a height of the inner side wall surface portion.

13. The electric drive device as claimed in claim 12, wherein a height of the outer side wall surface portion forming the arc-shaped seal groove is set to be higher than a height of the outer side wall surface portion forming the straight seal groove.

14. The electric drive device as claimed in claim 13, wherein the penetration hole is formed at an outer side of the outer side wall surface portion forming the arc-shaped seal groove.

* * * * *